United States Patent

Carli

[11] 4,066,292
[45] Jan. 3, 1978

[54] AUTOMOBILE WITH SUNSHINE ROOF

[75] Inventor: Renzo Carli, Turin, Italy

[73] Assignee: Carrozzeria Pininfarina S.p.A., Grugliasco (Turin), Italy

[21] Appl. No.: 758,273

[22] Filed: Jan. 10, 1977

[51] Int. Cl.$^2$ .............................................. B60J 7/00
[52] U.S. Cl. .............................................. 296/137 C
[58] Field of Search .......... 296/137 C, 137 D, 137 B, 296/137 R

[56] References Cited

U.S. PATENT DOCUMENTS

| 3,819,227 | 6/1974 | Carli | 296/137 D |
| 3,913,971 | 10/1975 | Green | 296/137 B |

FOREIGN PATENT DOCUMENTS

| 2,263,120 | 3/1974 | France | 296/137 C |

Primary Examiner—Robert R. Song
Attorney, Agent, or Firm—Sughrue, Rothwell, Mion, Zinn and Macpeak

[57] ABSTRACT

An automobile having a sunshine roof of the kind having a flexible roof covering which is held down along its longitudinal edges by flexible tensioning straps when the roof is closed is equipped with a removable rigid transparent plastics panel which may be fitted in place of the roof covering and sealed along its two lateral edges by the tensioning straps. The straps are molded with teeth or ribs which bear against the lateral edges of the panel, the strips holding these edges down on the longitudinal channel section runners of the roof aperture.

8 Claims, 8 Drawing Figures

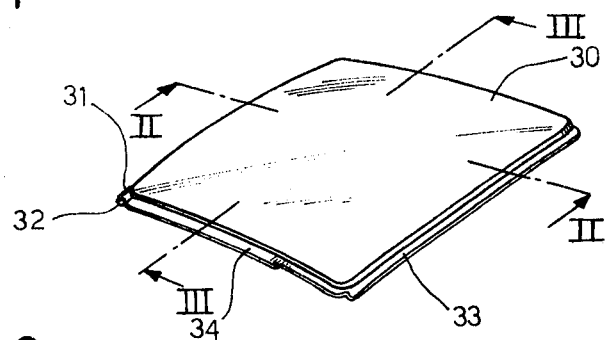
FIG. 1
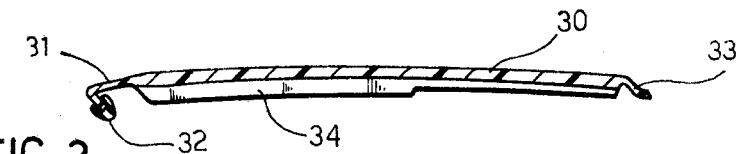
FIG. 2
FIG. 3
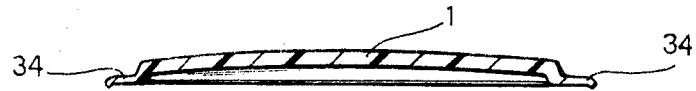
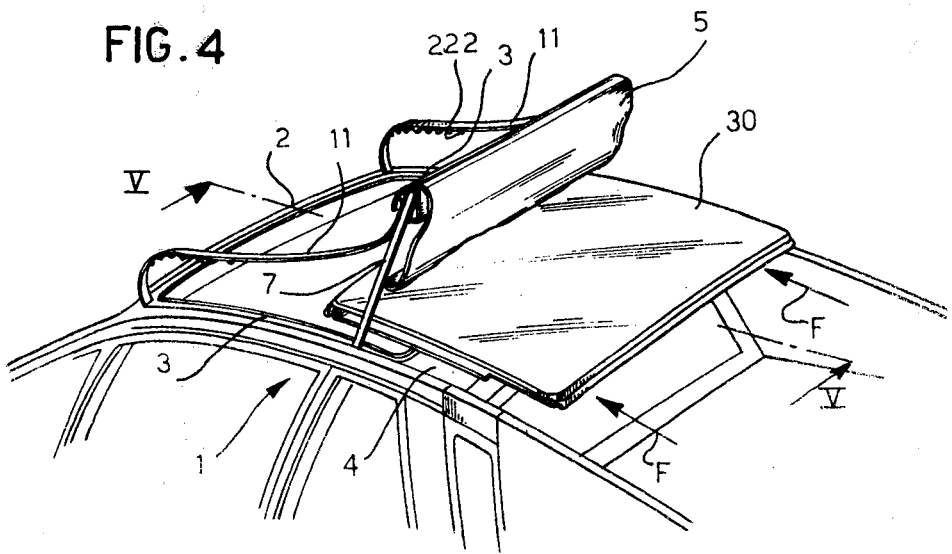
FIG. 4

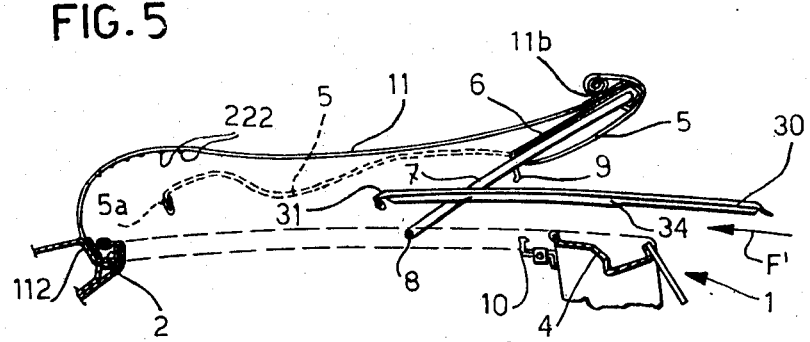
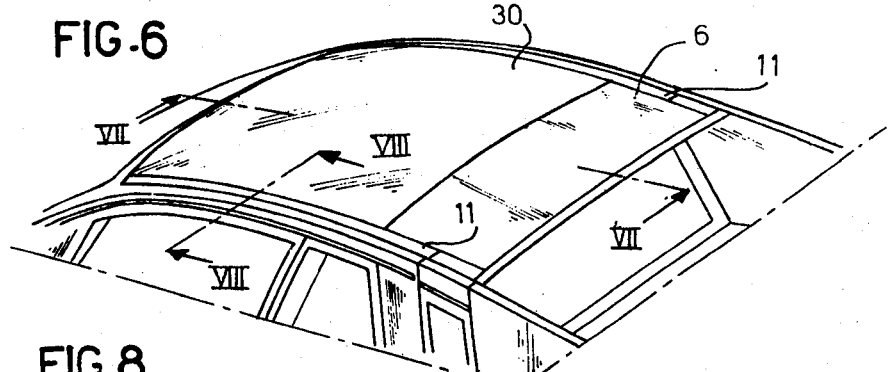
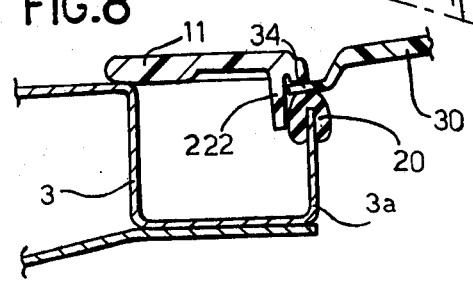
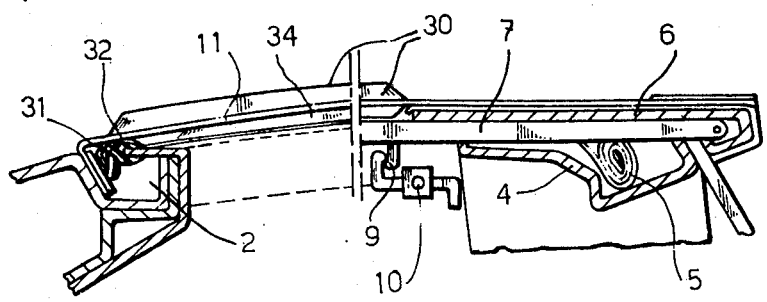

AUTOMOBILE WITH SUNSHINE ROOF

BACKGROUND OF THE INVENTION

The present invention relates to improvements to an automobile sunshine roof of the kind described in British Pat. No. 1,444,709, having means defining a roof aperture including a front cross member of upwardly open channel section, a rear cross member of upwardly open trough shaped cross section having front and rear walls, and two longitudinal runners of upwardly open channel section having inner and outer walls, a flexible roof covering, a cross-piece to which the rear edge of said roof covering is attached, two levers supporting the said cross-piece and pivotally attached to said longitudinal runners, and a pair of flexible straps attached to opposite ends of said cross-piece, the leading ends of said straps being adapted to engage in the channel of the front cross member to tension the straps, which cover the longitudinal edges of the roof covering when the latter is fitted over said roof aperture.

The object of the present invention is to provide, for an automobile with a sunshine roof, a transparent rigid roof panel which is removable, which can be stowed in the automobile trunk when not in use and which can be fixed over the roof aperture in place of the flexible roof covering.

The transparent roof panel to which the present invention relates is intended to be used, in particular, on an automobile having a roof aperture of the type described above, in which use is made of the flexible straps which normally serve to cover the longitudinal edges of the roof covering when the latter is in its closed position over the roof aperture.

SUMMARY OF THE INVENTION

The present invention provides, in an automobile sunshine roof of the kind referred to, a removable roof panel for use as an alternative to the flexible roof covering, comprising a sheet of transparent rigid plastics material, provided with hook means at its front edge which engages in the channel section front cross member and further provided with a lip on its rear edge which fits over the front wall of the trough shaped rear cross member, the lateral edges of said sheet cooperating along their lower surfaces with the inner walls of the channel section side runners while the upper surfaces of said sheet are covered along said lateral edges by the flexible straps normally used to cover and exert pressure upon the longitudinal edges of the flexible roof covering in the closed position of the latter.

BRIEF DESCRIPTION OF THE DRAWINGS

Further characteristics and advantages of the present invention will be apparent from the following description, given by way of example, with reference to the accompanying drawings, wherein:

FIG. 1 is a perspective view of the rigid transparent roof panel for an automobile roof according to one embodiment of the invention;

FIG. 2 is a section of the roof panel taken on the line II—II in FIG. 1;

FIG. 3 is a section of the roof panel taken on the line III—III in FIG. 1;

FIG. 4 is a partial perspective view of an automobile showing the transparent rigid roof panel according to the invention in the course of being fitted;

FIG. 5 is a section taken on the line V—V in FIG. 4;

FIG. 6 is a similar partial perspective view to FIG. 4 showing the automobile after the fitting of the rigid transparent roof panel;

FIG. 7 is a section taken on the line VII—VII in FIG. 6;

FIG. 8 is a section on an enlarged scale taken on the line VIII—VIII in FIG. 6.

DETAILED DESCRIPTION OF THE ILLUSTRATED EMBODIMENT

The rigid transparent roof panel according to the present invention is made of a pressed sheet 30 of transparent plastics material, for example, a polymethacrylate type resin. The sheet 30 can be either colored or neutral. In particular, the sheet 30 may be colored, for example green or blue, to provide a filter for solar radiation.

The sheet 30 is provided on its front edge with a hook-shaped fastening strip 31 formed integrally with the sheet. The free edge of the strip 31 is provided with a profiled sealing member in the form of a bead 32 of elastomeric material.

The sheet 30 is provided with a shaped lip 33 on its rear edge.

Two laterally outwardly projecting wings 34 are provided on both longitudinal side edges of the sheet 30. The wings 34 extend along at least the leading half of each longitudinal side edge of the sheet 30 from the front edge of the sheet, as shown in FIG. 2.

The transparent head described above can be stowed in the trunk or luggage compartment of an automobile 1, shown partially in FIGS. 4 and 5.

The automobile 1 shown in the drawings is equipped with a sunshine roof having a flexible roof covering which can be used either in a closed or an open position, as described and illustrated in the British Pat. No. 1,444,709.

The automobile 1 has, at the front of its roof, a rectangular aperture delimited at its front edge by a front cross member 2 over the windshield of the vehicle. The cross member 2 has an upwardly open channel section. The rear edge of the roof aperture is defined by an upwardly open trough-shaped rear cross member 4 over the rear window of the vehicle. The longitudinal edges of the roof aperture are defined by two longitudinal side runners 3 of upwardly open channel section.

A flexible roof covering 5 is adapted to fit over the roof aperture and has at its leading edge an enlarged bead 5a which fits into the channel of the front crossmember 2 when the roof is closed. The rear edge of the roof covering 5 is fixed to a rear cross-piece 6 supported along its two longitudinal edges by two levers 7 hinged to the respective runners 3. The two levers 7 are fitted with hooks 9 adapted to engage catches 10 on the vehicle body when the levers 7 are lowered parallel to the runners 3 with the hooks 9 lowermost.

Two flexible and inextensible straps 11 are secured at their front ends 11a to the front cross member 2. The rear ends 11b of the straps are secured to the rear cross-piece 6. The two straps 11 extend above the longitudinal side edges of the flexible roof covering 5 and are tensioned by rotating the levers 7 towards the rear of the vehicle, as shown in FIG. 5. This also tensions the flexible roof covering 5 when the front edge bead 5a of the latter is hooked into the channel of the front cross-member 2.

The front part of each of the flexible straps 11 is moulded on its underside with a number of transverse ribs or teeth 222 spaced apart at equal intervals. The ribs 222 serve normally to retain the side edges of the flexible roof covering 5 tightly between the said ribs 222 themselves and the upstanding inner walls of the respective channel section side runners 3, said inner walls being capped by strips 20 of elastomeric material (FIG. 8).

To fit the rigid transparent head shown in FIGS. 1 to 3 onto the automobile having a sunshine roof of the type already described, the sequence of operations illustrated in FIGS. 4 to 6 is followed.

The levers 7 are first lifted to bring them into the positions shown in FIGS. 4 and 5. The leading edge bead 5a of the flexible roof covering 5 is then unhooked from the front cross member 2, as illustrated by the broken line in FIG. 5, and the roof covering 5 is wrapped around the rear cross-piece 6 and partially rolled up, as shown in full lines in FIGS. 4 and 5.

The sheet 30 which forms the rigid transparent roof panel is then inserted and pushed horizontally in a forward direction from the rear of the automobile, in the direction of the arrows F in FIGS. 4 and 5, so as to engage its hook-shaped fastening strip 31 into the channel of the front cross-piece 2.

The rear lip 33 of the sheet 30 rests, in the fitted position of the sheet 30, on the front wall of the trough-shaped rear cross-piece 4, and the two lateral wings 34 rest upon the capping strips 20 of elastomeric material fitted to the inner walls of the two channel section side runners 3.

After having placed the sheet 30 in position in the roof aperture the levers 7 are rotated towards the rear of the automobile so as to bring them into the substantially horizontal position shown in FIGS. 6 and 7, in which they lie upon the grooved runners 3, the remainder of the flexible roof covering 5 being rolled up and stowed in the trough shaped rear cross member 4. The two flexible straps 11 are thereby tensioned and rest upon the lateral wings 34 of the sheet 30. The ribs 222 of the strips press against the outer longitudinal edges of the wings 34 and thus serve to locate the transparent roof panel laterally.

It will be understood that constructional details of practical embodiments of the invention can be varied widely from that described and illustrated, without departing from the scope of the present invention.

What is claimed is:

1. In an automobile provided with a sunshine roof having means defining a roof aperture including a front cross member of upwardly open channel section, a rear cross member of upwardly open trough shaped cross section having front and rear walls, and two longitudinal runners of upwardly open channel section having inner and outer walls, a flexible roof covering, a cross-piece to which the rear edge of said roof covering is attached, two levers supporting the said cross-piece and pivotally attached to said longitudinal runners, and a pair of flexible straps attached to opposite ends of said cross-piece, the leading ends of said straps being adapted to engage in the channel of the front cross member to tension the straps, which cover the longitudinal edges of the roof covering when the latter is fitted over said roof aperture, the improvement which comprises a removable roof panel for use as an alternative to the flexible roof covering, comprising a sheet of transparent rigid plastics material, provided with hook means at its front edge which engages in the channel section front cross member and further provided with a lip on its rear edge which fits over the front wall of the trough shaped rear cross member, the lateral edges of said sheet cooperating along their lower surfaces with the inner walls of the channel section side runners while the upper surfaces of said sheet are covered along said lateral edges by the flexible straps normally used to cover and exert pressure upon the longitudinal edges of the flexible roof covering in the closed position of the latter.

2. An automobile as defined in claim 1, wherein the hook means at the front edge of the plastics sheet is integral with the plastics sheet and is provided with a sealing member of elastomeric material on its free edge.

3. An automobile as defined in claim 1, wherein a strip of elastomeric material is fitted to the inner wall of each channel section side runner and wherein the plastics sheet is formed with two lateral wings which extend along at least a part of each longitudinal edge of the sheet from its front edge, each of said wings being held, when the sheet is fitted over the roof aperture, between said strip of elastomeric material provided on the inner wall of the cooperating side runner, and the associated flexible strap, each said strap having ribs on its lower surface which engage the outer edge of the adjacent said lateral wing to retain the panel laterally in its fitted position.

4. An automobile as defined in claim 3, wherein the ribs on the flexible strap comprise evenly spaced apart tooth-shaped projections formed integrally with the associated strap as a single piece of plastics material.

5. An automobile as defined in claim 1, wherein the sheet constituting the roof panel comprises a pressing of polymethacrylate type resin.

6. An automobile as defined in claim 1, wherein the sheet constituting the roof panel is of a neutral color.

7. An automobile as defined in claim 1, wherein the sheet constituting the roof panel is colored.

8. An automobile as defined in claim 7, wherein said sheet is of a color suitable as a solar radiation filter.

* * * * *

UNITED STATES PATENT AND TRADEMARK OFFICE
CERTIFICATE OF CORRECTION

PATENT NO. : 4,066,292
DATED : January 3, 1978
INVENTOR(S) : Renzo CARLI

It is certified that error appears in the above-identified patent and that said Letters Patent are hereby corrected as shown below:

IN THE HEADING:

FOREIGN APPLICATION PRIORITY DATA:

Insert -- February 6, 1976    Italy ....... 67272/76 --.

Signed and Sealed this

Second Day of May 1978

[SEAL]

Attest:

RUTH C. MASON
Attesting Officer

LUTRELLE F. PARKER
Acting Commissioner of Patents and Trademarks